US010298481B1

(12) United States Patent
Goldschlager (10) Patent No.: US 10,298,481 B1
(45) Date of Patent: May 21, 2019

(54) METHOD AND APPARATUS FOR TESTING VLAN

(71) Applicant: MARVELL ISRAEL (M.I.S.L) LTD., Yokneam (IL)

(72) Inventor: Robert Goldschlager, Tel Aviv (IL)

(73) Assignee: MARVELL ISRAEL (M.I.S.L) LTD., Yokneam (IL)

( * ) Notice: Subject to any disclaimer, the term of this patent is extended or adjusted under 35 U.S.C. 154(b) by 261 days.

(21) Appl. No.: 14/699,376

(22) Filed: Apr. 29, 2015

Related U.S. Application Data (60) Provisional application No. 61/985,574, filed on Apr. 29, 2014, provisional application No. 61/986,636, filed on Apr. 30, 2014.

(51) Int. Cl.
  *H04L 12/26* (2006.01)
  *H04L 29/12* (2006.01)
  *H04L 12/46* (2006.01)

(52) U.S. Cl.
  CPC .......... *H04L 43/50* (2013.01); *H04L 12/4641* (2013.01); *H04L 61/6022* (2013.01)

(58) Field of Classification Search
  CPC ....... H04L 43/062; H04L 47/19; H04L 43/50; H04L 43/067; H04L 12/26; H04L 12/16; H04J 1/16
  See application file for complete search history.

(56) References Cited

U.S. PATENT DOCUMENTS

| | | | | |
|---|---|---|---|---|
| 9,124,529 B1* | 9/2015 | Chadha | ................... | H04L 43/50 |
| 2004/0218542 A1* | 11/2004 | Lee | .......... | H04L 12/24 370/248 |
| 2005/0265356 A1* | 12/2005 | Kawarai | ............. | H04L 12/4641 370/395.53 |
| 2005/0281392 A1* | 12/2005 | Weeks | ................ | H04L 41/5077 379/22 |
| 2006/0002311 A1* | 1/2006 | Iwanaga | ............. | H04L 12/4675 370/254 |
| 2007/0258382 A1* | 11/2007 | Foll | ...................... | H04L 12/2602 370/252 |
| 2008/0117829 A1* | 5/2008 | Nakano | ................ | H04L 12/2697 370/247 |
| 2011/0194403 A1* | 8/2011 | Sajassi | .................. | H04L 12/462 370/217 |
| 2012/0106358 A1* | 5/2012 | Mishra | ................ | H04L 43/0817 370/242 |
| 2012/0170465 A1* | 7/2012 | Spieser | ............... | H04L 12/2697 370/249 |

* cited by examiner

*Primary Examiner* — Lan-Huong Truong (57) ABSTRACT

Aspects of the disclosure provide a network device that includes a test frame generator and an analyzer. The test frame generator is configured to generate a request frame that is compliant with a Layer 2 protocol and to transmit the request frame to a target network device that is a member of a virtual local area network (VLAN) of which the network device is also a member. The analyzer is configured to transmit a query to the target network device to detect whether a forwarding database associated with the target network device includes a first media access control (MAC) address of the network device, and to determine whether the target network device is connected to the network device based on the detection.

14 Claims, 8 Drawing Sheets

METHOD AND APPARATUS FOR TESTING VLAN

INCORPORATION BY REFERENCE

This present disclosure claims the benefit of U.S. Provisional Application No. 61/985,574, "Vlan Connectivity Test Protocol" filed on Apr. 29, 2014, and U.S. Provisional Application No. 61/986,636, "Vlan Trace Test Protocol" filed on Apr. 30, 2014, which are incorporated herein by reference in their entirety.

BACKGROUND

A local area network (LAN) is a computer network that interconnects computers in a limited area such as a home, school, computer laboratory, or office building using network media. Further, in a LAN, computers can be grouped into domains, such as virtual LANs (VLANs) and the like. In an example, computers in the same VLAN communicate using Layer 2 or Layer 3 communication, while computers in different VLANs communicate using higher layers, such as Layer 3 communication, and the like.

SUMMARY

Aspects of the disclosure provide a network device that includes a test frame generator and an analyzer. The test frame generator is configured to generate a request frame that is compliant with a Layer 2 protocol and to transmit the request frame to a target network device that is a member of a virtual local area network (VLAN) of which the network device is also a member. The analyzer is configured to transmit a query to the target network device to detect whether a forwarding database associated with the target network device includes a first media access control (MAC) address of the network device, and to determine whether the target network device is connected to the network device based on the detection.

According to an aspect of the disclosure, the test frame generator is configured to generate the request frame that includes the first MAC address of the network device, a second MAC address associated with the target network device, and a number to identify the VLAN. In an example, the second MAC address is at least one of a unicast MAC address, a multicast MAC address and a broadcast MAC address.

In an embodiment, the test frame generator is configured to generate the request frame that includes a reply field indicative of whether a reply is required. In an example, the test frame generator is configured to generate the request frame that includes a request time field to carry a request time when the request frame is sent out of the network device and the analyzer is configured to calculate a round-trip time based on a time when a reply frame is received and the request time, the reply frame being generated in response to the request frame, and the reply frame carrying the request time.

According to an aspect of the disclosure, the test frame generator is configured to generate the request frame that includes a hops field to carry a number of hops and the analyzer is configured to construct a path from the network device to the target network device based on hop numbers carried by reply frames that are generated and sent by devices on the path in response to the request frame.

In an example, the analyzer is configured to transmit the query that is compliant with a Layer 3 network protocol.

Aspects of the disclosure provide a method for testing a network. The method includes generating, by a network device, a request frame that is compliant with a Layer 2 protocol, transmitting the request frame from the network device to a target network device that is a member of a virtual local area network (VLAN) of which the network device is also a member, transmitting, a query to the target network device to detect whether a forwarding database associated with the target network device includes a first media access control (MAC) address of the network device, and determining whether the target network device is connected to the network device based on the detection.

Aspects of the disclosure provide another network device including a test frame processor configured to receive a request frame that is generated by a source network device and compliant with a Layer 2 protocol, update a number of hops in the request frame, forward the request frame, and transmit a reply frame to the source network device to report the number of hops.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
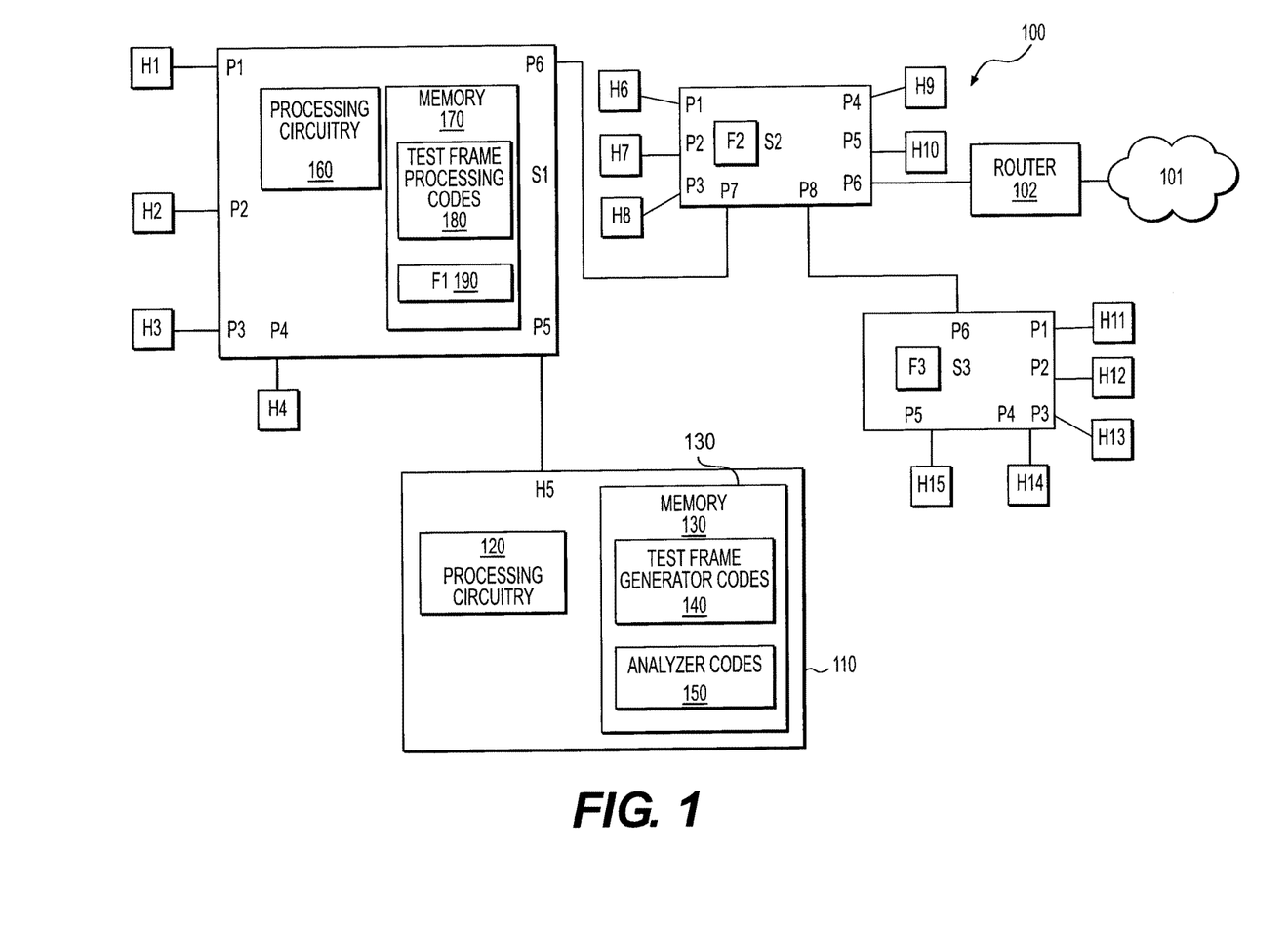
FIG. 1 shows a block diagram of a network example 100 according to an embodiment of the disclosure.

FIG. 1 shows a block diagram of a network example 100 according to an embodiment of the disclosure. In an example, the network 100 includes a plurality of devices coupled together to form a plurality of nodes in the network 100, such as host devices H1-H15 that form the host nodes, switch devices S1-S3 that form the switch nodes in the FIG. 1 example. Among the devices, at least one device, such as the host device H5, is configured to enable a Layer 2 connectivity test and/or a Layer 2 trace test by a processing circuitry to determine connectivity/trace between two devices, such as the host device H5 and another device in the network 100.

The network 100 can be any suitable network. In an example, the network 100 is a local area network (LAN) 100. The LAN 100 is a Layer 2 network that uses a data link protocol, such as Ethernet protocol, and the like, for communication between hosts in the LAN. In the FIG. 1 example, the LAN 100 is coupled to Internet 101 via a router 102 for example. In an example, communication to the Internet 101 crosses the border of the LAN 100 and continues using a higher level protocol, such as Layer 3 protocol, and the like.

The host devices H1-H15 can be any suitable devices, such as voice over IP (VoIP) phones, computers, laptops, TVs, servers, and the like that are configured to be a source of network traffic and/or a destination of network traffic. Generally, a host device includes one or more ports connected to the switch devices S1-S3. It is noted that when the host device includes multiple ports connected to the switch devices S1-S3, the host device is considered as a set of devices and each connection has its own MAC address. The host devices are coupled with the switch devices by wire connection and/or wireless connection, and communicate via the switch devices.

The switch devices S1-S3 can be any suitable switch devices. Generally, a switch device includes a plurality of ports connected to host devices and/or other switch devices. The switch device is configured to receive a network traffic unit (e.g., a data link frame) from a port (e.g., ingress port) and forward the received network traffic unit to one or more ports (e.g., egress ports) based on network configuration information. In an embodiment, a switch device includes a plurality of tables storing network configuration information. The network configuration information includes, for example, port connectivity information of the switch device, port connectivity information of other switch devices in the LAN 100, virtual LAN (VLAN) configuration, and the like. In an example, the network configuration information is updated via a software program application by a network administrator.

Generally, a LAN can include a large amount of multicast and/or broadcast traffic. When the LAN has a large number of devices, such as hundreds of devices, traffic may be sent to unnecessary destinations. According to an aspect of the disclosure, the LAN 100 can be configured to include multiple sub-networks that use Layer 2 protocol for communication within a sub-network and use higher Layer protocols, such as a Layer 3 protocol, and the like, for communication across borders of the sub-networks.

In an embodiment, computers owned by people in a workgroup tend to multicast or broadcast more messages to people in the same workgroup than people in the different workgroups. The computers are virtually grouped to form a VLAN that uses multicast or broadcast for communication within the VLAN, and thus network traffic can be reduced by not sending network traffic to other workgroups (e.g., other VLANs). In an example, multiple workgroups or VLANs are configured in the LAN 100. Within a VLAN, data link frames are broadcasted using a Layer 2 protocol that is based on media access control (MAC) address, in an embodiment. The VLANs are mutually isolated so that data link frames pass between them using higher level protocols, such as Layer 3 protocol that is based on logical address (e.g., Internet Protocol (IP) address) and the like.

According to an aspect of the disclosure, connectivity and trace detection software applications that are based on higher Layer protocols, such as Layer 3 protocol and above, are not enough to diagnose issues in the network 100. For example, a network administrator frequently needs to discover lost connectivity from a host device, such as H5 and the like, to a server in the network 100 or Internet 101. When the network administrator uses a software application according to the Layer 3 Internet control message protocol (ICMP), the software application does not provide enough information to the network administrator to detect where on the path from the host device to the server the connectivity is disrupted. In another example, the network administrator uses a computer network diagnostic software tool, such as TraceRoute that is based on Layer 3 or Layer 4 protocol, to trace the path from the a host device, such as H5 and the like to a server in the network 100 or Internet 101. The TraceRoute checks connectivity between broadcast domains, but does not provides connectivity information within a broadcast domain.

Further, in an example, the LAN 100 can include a large number of host devices, such as over hundreds of host devices. The large number of host devices, in conjunction with numerous intermediate nodes (e.g., switch devices), can form a complicated network and can be configured to have a complicated VLAN architecture. Software applications that are based on Layer 3 and above protocols are not enough to diagnose issues in the LAN 100.

According to an aspect of the disclosure, a Layer 2 based protocol is developed and used in the LAN 100 to perform connectivity tests and/or trace tests to assist a network administrator to diagnose issues in the LAN 100. In an example, to diagnose a connectivity issue associated with the host device H5, software instructions compliant with the Layer 2 based protocol are installed and executed on the host device H5.

In the FIG. 1 example, the host device H5 includes a processing circuitry 120 and a memory module 130. The processing circuitry 120 executes system and application codes. The memory module 130 stores the system and application codes, and data for processing. For example, a memory space 140 is allocated to store software codes for a test frame generator compliant with the Layer 2 based protocol, and a memory space 150 is allocated to store software codes for an analyzer configured to diagnose connectivity issues. The memory module 130 can include any suitable memory, such as a hard disk drive, an optical storage medium, a solid-state drive, an internal memory, an external memory, and the like.

In an embodiment, the processing circuitry 120 executes the software codes stored at the memory space 140 to act as a test frame generator, and executes the software codes stored at the memory space 150 to act as an analyzer. The test frame generator is configured to generate a request frame which is a data link frame compliant with the Layer 2 protocol. The request frame is transmitted into the network 100 via an interface circuit (not shown), such as a port coupled with the switch device S1. The analyzer is configured to diagnose connectivity issues associated with the host device H5.

In an example, the processing circuitry 120 and the memory 130 are internal components of the host device H5. In another example, the processing circuitry 120 and the memory 130 are external components that are plugged into the host device H5.

In the FIG. 1 example, the switch devices S1-S3 are configured to process the request frames. For example, the switch device S1 includes a processing circuitry 160 and a memory module 170. The processing circuitry 160 executes system and application codes. The memory module 170 stores the system and application codes, and data for processing. For example, a memory space 180 is allocated to store test frame processing codes, and a memory space 190 is allocated to store a forwarding database F1.

In an embodiment, the processing circuitry 160 executes the test frame processing codes stored at the memory space 180, and updates the forwarding database F1 stored at the memory space 190. It is noted that, in another embodiment, the test frame processings can be performed solely by hardware. It is also noted that other switch devices S2-S3 can utilize certain components that are identical or equivalent to those used in the switch device S1.

During operation, in an embodiment to detect connectivity between the host device H5 to another device, such as the switch device S3 and the like, in the network 100, the test frame generator generates a request frame having a source MAC address field, a destination MAC address and a VLAN identification (VID) field. The request frame includes a first MAC address (e.g., a MAC address of the host device H5) in the source MAC address field, a second MAC address (e.g., MAC address of a destination device S3) in the destination MAC address field, and a VLAN identification number in the VID field. The request frame can include other suitable information. In an example, the request frame can indicate whether a reply is required. In another example, the request frame can indicate whether proxy is permitted. In another example, the request frame includes a request time field to carry a time when the request frame is generated and sent. In another example, the request frame includes a request identification (ID) field to carry identification information for the request frame. In another example, the request frame includes a hops field to carry a number of hops that can be used later for path reconstruction.

Then, the request frame is transmitted in the network 100. The switch devices then process the request frame according to the Layer 2 protocol. In an example, when a switch device, for example, the switch device S1 receives the request frame, the switch device S1 updates the forwarding database F1 according to the request frame. In an embodiment, the forwarding database F1 includes information that associates ports of the switch device S1 with MAC addresses of devices in the network 100. The forwarding database F1 is used to forward data link frames. For example, when the forwarding database F1 associates a port of the switch device S1 with an MAC address of a device, frames with the MAC address in the destination MAC address field are sent out of the switch device S1 via the port.

When the switch device S1 receives a data link frame, such as the request frame, from a specific port, the switch device S1 checks whether the first MAC address in the source MAC address field of the data link frame is in the forwarding database F1. When the first MAC address is not in the forwarding database, the switch device S1 adds an entry in the forwarding database to associate the first MAC address with the specific port. The entry can be used later to forward data link frames to a device identified by the first MAC address. Further, the switch device S1 checks whether the second MAC address in the destination MAC field of the data link frame is in the forwarding database F1. When the second MAC address is associated with a port of the switch device S1 in the forwarding database F1, the data link frame is sent out of the switch device S1 via the port. When the second MAC address is not in the forwarding database F1, the switch device S1 broadcasts the data link frame according to the VLAN identification number in the VID field. For example, the switch device S1 maintains a VLAN configuration. The VLAN configuration identifies a group of ports that are members for the VLAN identification number, and the switch device S1 can forward the data link frame to the group of ports that are the members of the VLAN identification.

Further, in the embodiment, the analyzer is configured to transmit a query, such as a query compliant with a Layer 3 network protocol, to a target device to detect connectivity between the host device H5 and the target device. For example, the analyzer generates a query compliant with the Layer 3 network protocol to the switch device S3 to detect whether the forwarding database F3 has an entry that associates the MAC address of the host device H5 with a port, such as port P6 in the FIG. 1 example. The analyzer can use any suitable Layer 3 network protocol to generate and transmit the query. When the analyzer receives a confirmation that the entry that associates the MAC address of the host device H5 exists in the forwarding database F3, the analyzer determines that the host device F5 is connected with the switch device S3.

In another embodiment to detect connectivity between the host device H5 to another device in the network 100, the test frame generator generates a request frame with fields similar to the above example. In addition, the request frame includes a reply requirement indicator that indicates a requirement of a reply, and a request time field that carries a request time when the request frame is generated and transmitted.

The switch devices then process the request frame according to the Layer 2 protocol similar to the above examples. In addition, when a device having the second MAC address in the destination MAC address field of the request frame receives the request frame, the device generates and sends a reply frame which is a data link frame. The reply frame carries the request time back to the host device H5. Further, in the embodiment, when the host device H5 receives the reply frame, the analyzer calculates a round-trip time based on a receiving time of the reply frame and the request time carried by the reply frame.

In another embodiment, the request frame includes a reply from proxy acceptable indicator field that indicates whether proxy is acceptable. When proxy is acceptable, in an example, a device that has direct connection with the destination device having the destination MAC address can reply on behalf of the destination device. For example, when the destination device is the host device H15, and the proxy is acceptable, the switch device S3 can reply on behalf of the host device H15.

In an embodiment to trace a path from the host device H5 to a destination device, the test frame generator generates a request frame with fields similar to the above examples. In addition, the request frame includes a hops field to carry a number of hops. In an example, the initial number of hops is set to zero.

The switch devices then process the request frame according to the Layer 2 protocol similar to the above examples. In addition, in an example, when a switch device receives the request frame, the switch device updates the hops field (e.g., adding by one) in the request frame, and forwards the updated request frame. Further, the switch device sends a reply frame carrying the number hops back to the host device H5 via the network 100. When the host device H5 receives reply frames sent back from devices on the path, the analyzer is configured to determine the path from the host device H5 to the destination device based on the received reply frames.

It is noted that the request frame can use unicast MAC address and multicast MAC address in the destination MAC address field.

Figure 2:
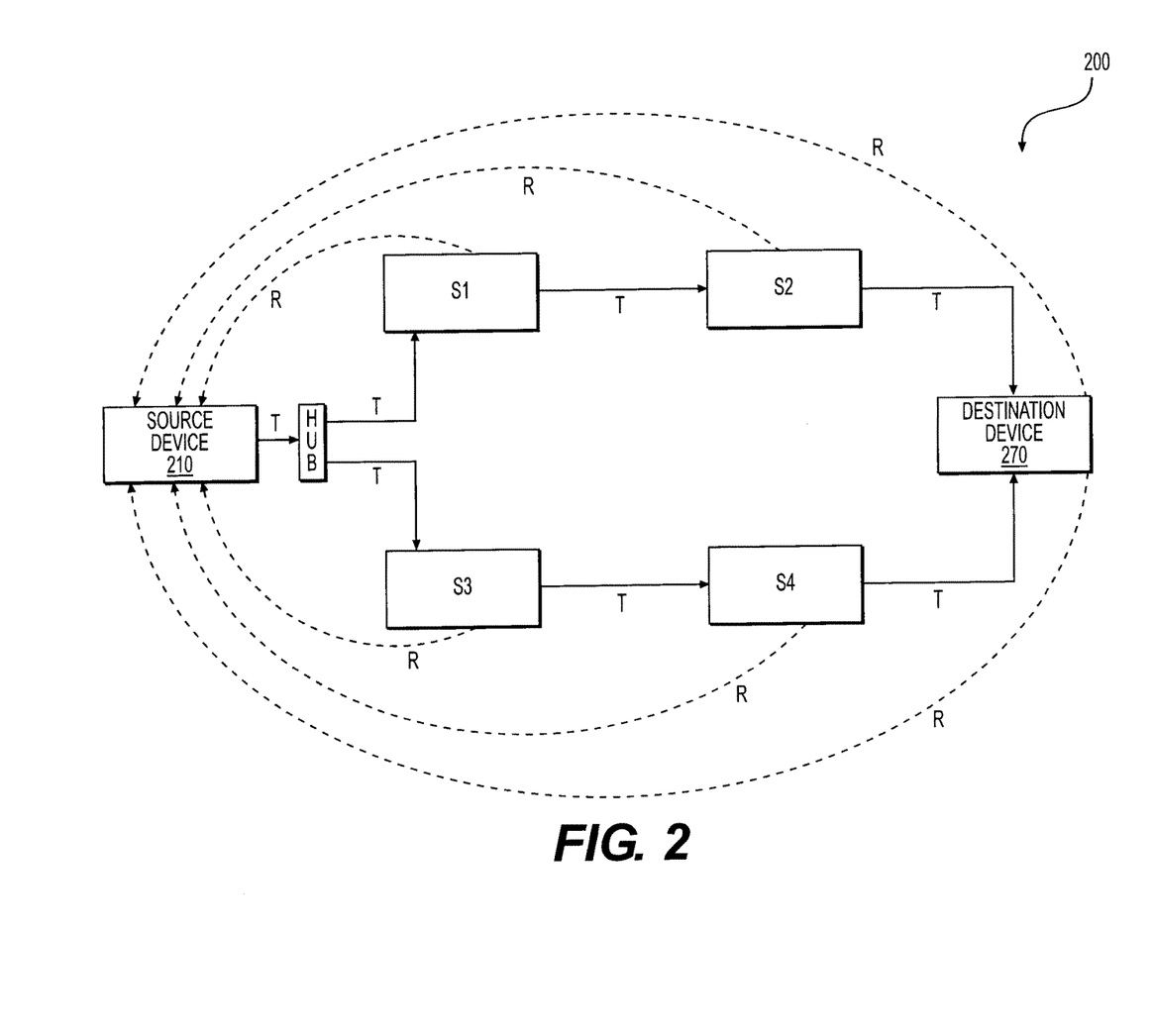
FIG. 2 shows a trace scenario of a network example 200 according to an embodiment of the disclosure.

FIG. 2 shows a trace scenario of a VLAN example 200 according to an embodiment of the disclosure. The VLAN 200 includes a source device 210, a destination device 270, an Ethernet hub, and a plurality of switch devices S1-S4 coupled together as shown by solid lines in FIG. 2. In an example, the source device 210 is similarly configured as the host device H5 in FIG. 1, the destination device 270 can be a host device or can be a switch device, the switch devices S1-S4 are similarly configured as the switch S1 in the FIG. 1.

In the scenario shown in FIG. 2, the Ethernet hub has multiple input/output (I/O) ports, and the source device 210, the switch S1 and switch S2 are respectively connected with one of the I/O ports of the Ethernet hub. In the Ethernet hub, a signal introduced at an input of a port appears at the output of every port except the original incoming port.

In this scenario, in an example, the source device 210 generates a request frame having a source media access control (MAC) address field, a destination MAC address, and a hops field. The request frame includes a first MAC address (e.g., a MAC address of the source device 210) in the source MAC address field, a second MAC address (e.g., MAC address of the destination device 270) in the destination MAC address field, and an initial number of hops, such as zero in the hops field. In this scenario, the second MAC address is a unicast address. The request frame can include other suitable information. The request frame is transmitted in the VLAN 200 as shown by "T" according to the network configuration of the VLAN 200.

Further, in an embodiment, each of the switch and host devices that receives the request frame updates the hops field in the request frame, forwards the updated request frame according to the network configuration of the VLAN 200, generates a reply frame with the number of hops, and sends the reply frame back to the source device 210 via the VLAN 200 according to the network configuration as shown by "R". It is noted that a reply frame may be transmitted via a reverse path of a path from the source device 210 to the device that generates the reply frame.

Figure 3:
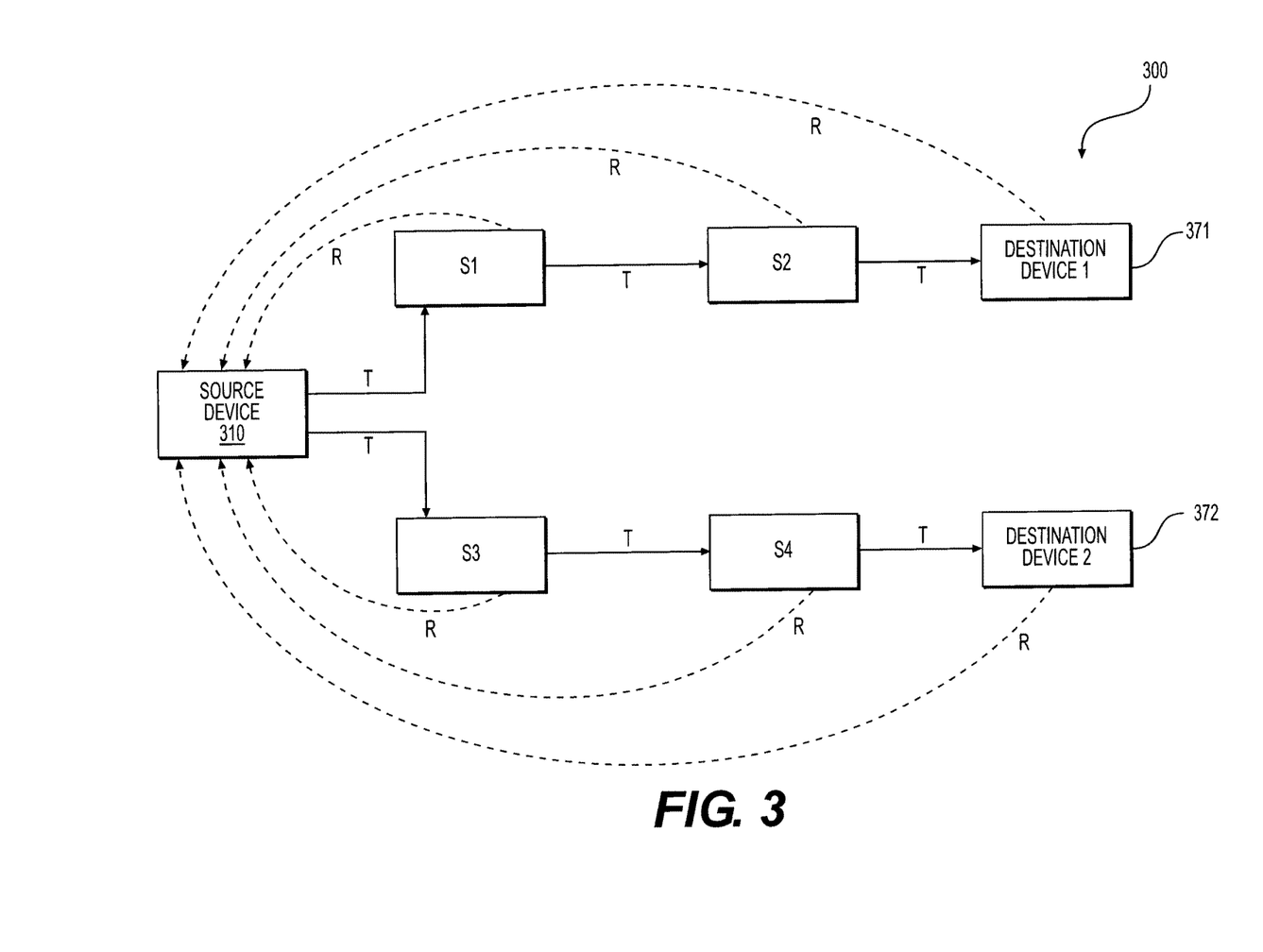
FIG. 3 shows a trace scenario of a network example 300 according to an embodiment of the disclosure.

FIG. 3 shows a trace scenario of a VLAN example 300 according to an embodiment of the disclosure. The VLAN 300 includes a source device 310, two destination devices 371-372, and a plurality of switch devices S1-S4 coupled together as shown by solid lines in FIG. 3. The source device 310 is similarly configured as the host device H5 in FIG. 1, the destination devices 371-372 can be host devices or can be switch devices, the switch devices S1-S4 are similarly configured as the switch S1 in the FIG. 1.

In this scenario, the VLAN 300 is configured to have multicast configuration. In an example, the VLAN 300 has a configurable list of multicast MAC addresses in which the least significant bit of the most significant address octet is set to 1. For example, a multicast MAC address is assigned to represent a group of the destination devices 371-372. In this scenario, in an example, the source device 310 generates a request frame having a source MAC address field, a destination MAC address, and a hops field. The request frame includes a first MAC address (e.g., a MAC address of the source device 310) in the source MAC address field, the multicast MAC address (e.g., multicast MAC address of the destination devices 371-372) in the destination MAC address field, and an initial number of hops, such as zero in the hops field. The request frame can include other suitable information. The request frame is transmitted in the VLAN 300 as shown by "T" according to the network configuration of the VLAN 300.

Further, in an embodiment, each of the devices that receives the request frame updates the hops field in the received request frame, forwards the updated request frame according to the network configuration of the VLAN 300, generates a reply frame to carry the number of hops, and sends the reply frame back to the source device 310 as shown by "R". It is noted that a reply frame may be transmitted via a reverse path of a path from the source device 310 to the device that generates the reply frame.

Figures 4A, 4B:
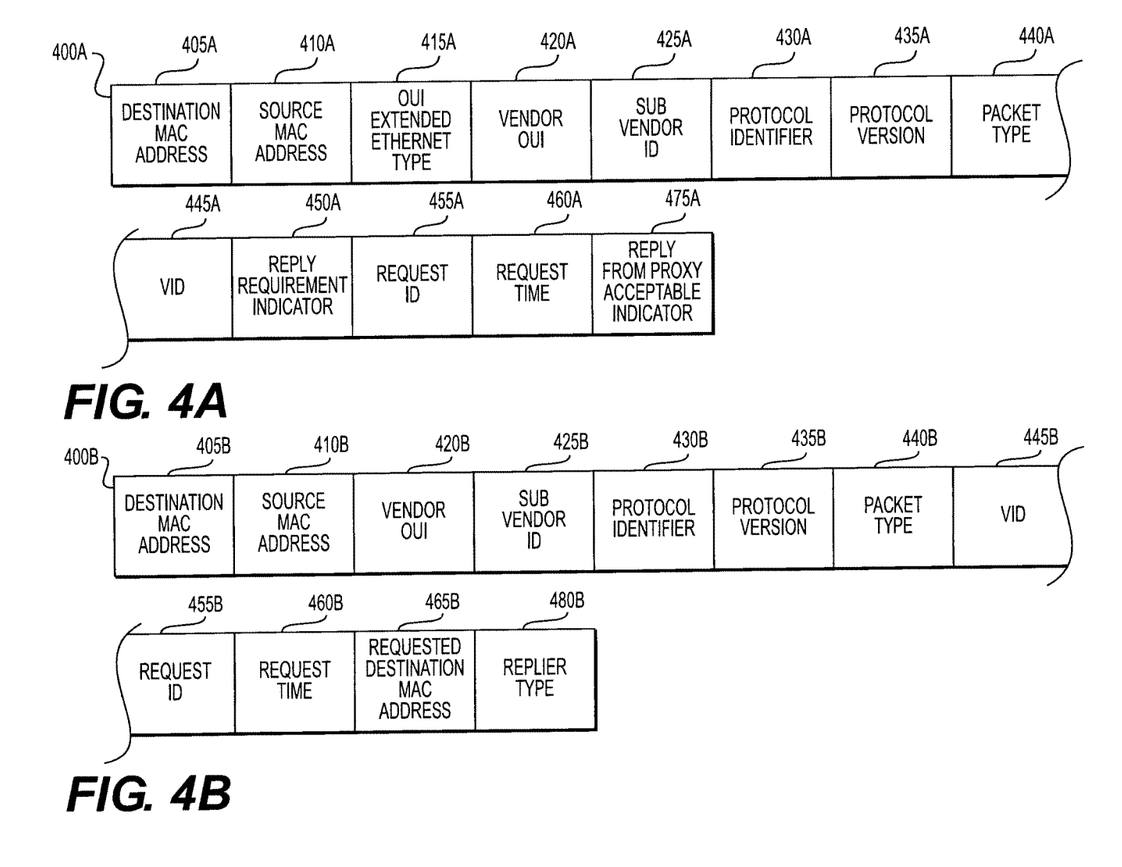
FIGS. 4A-4D show format examples 400A-400D according to an embodiment of the disclosure.

FIG. 4A shows a format example 400A of a request frame according to an embodiment of the disclosure. In an example, the test frame generator in the FIG. 1 example generates a request frame of the format 400A to test connectivity. The format 400A includes a plurality of fields, such as a destination MAC address field 405A, a source MAC address field 410A, an organizationally unique identifier (OUI) extended Ethernet type field 415A, a vendor OUI field 420A, a sub vendor identification (ID) field 425A, a protocol identifier field 430A, a protocol version field 435A, a packet type field 440A, a VLAN identification (VID) field 445A, a reply requirement indicator field 450A, a request identification (ID) field 455A, a request time field 460A and a reply from proxy acceptable indicator field 475A.

The destination MAC address field 405A is dedicated to include the MAC address of the destination device of the request frame. In an example, six bytes are allocated to the destination MAC address field 405A. The source MAC address field 410A is dedicated to include the MAC address of the source device of the request frame. In an example, six bytes are allocated to the source MAC address field 410A. The OUI extended Ethernet type field 415A carries a specific value, for example, "88B7" in hexadecimal to indicate prototype and vendor-specific protocol development. The vendor OUI field 420A, the sub vendor identification (ID) field 425A, and the protocol identifier field 430A are fields saved for later use to carry specific information. The protocol version field 435A is used to identify a version of a protocol in use.

The packet type field 440A carries a value indicative of the frame type. For example, the value is "1" to indicate a request frame. In an example, one byte is allocated to the packet type field 440A. The VID field 445A is dedicated to include VLAN identification. In an example, one byte is allocated to the VID field 445A, and when VID is represented using four least significant bits (LSBs), the four most significant bits are set to zero.

The reply requirement indicator field 450A is used to indicate whether a reply is required. In an example, one byte is allocated to the reply requirement indicator field 450A. When the reply requirement indicator field 450A has a value of "0", reply is not required and when the reply requirement indicator field 450A has a value of "1", reply is required. For example, when a network administrator wants to measure a round-trip time, the reply requirement indicator field 450A is set to "1"; otherwise, the reply requirement indicator field 450A is set to "0". The request identification (ID) 455A is used to identify the request frame. The request time field 460A is used to include a request time when the request frame is generated and sent out by the source device, and is used to calculate a round-trip time. In an example, four bytes are allocated to the request time field 460A. The reply from proxy acceptable indicator field 475A is used to indicate whether a device in direct connection with the destination device can reply on the behalf of the destination device. In an example, one byte is allocated to the reply from proxy acceptable indicator field 475A. When the reply from proxy acceptable indicator field 475A has a value of "0", proxy is allowed, and when the reply from proxy acceptable indicator field 475A has a value of "1", proxy is not allowed.

FIG. 4B shows a format example 400B of a reply frame according to an embodiment of the disclosure. In an example, a destination device, such as the switch S3 in the FIG. 1 example generates a reply frame of the format 400B.

The format 400B includes a plurality of fields, such as a destination MAC address field 405B, a source MAC address field 410B, a vendor OUI field 420B, a sub vendor identification (ID) field 425B, a protocol identifier field 430B, a protocol version field 435B, a packet type field 440B, a VLAN identification (VID) field 445B, a request identification (ID) field 455B, a request time field 460B and a requested destination MAC address field 465B and a replier type field 480B.

The destination MAC address field 405B is dedicated to include the MAC address of the destination device of the reply frame. In an example, six bytes are allocated to the destination MAC address field 405B. The source MAC address field 410B is dedicated to include the MAC address of the source device of the reply frame. In an example, six bytes are allocated to the source MAC address field 410B. The vendor OUI field 420B, the sub vendor identification (ID) field 425B, and the protocol identifier field 430B are fields saved for later use to carry specific information. The protocol version field 435B is used to identify a version of the protocol in use.

The packet type field 440B carries a value indicative of the frame type. For example, the value is "2" to indicate a reply frame. In an example, one byte is allocated to the packet type field 440B. The VID field 445B is dedicated to include VLAN identification. In an example, one byte is allocated to the VID field 445B, and when VID is represented using four least significant bits (LSBs), the four most significant bits are set to zero.

The request identification (ID) 455B is used to identify the request frame in response to which the reply frame is generated. The request time field 460B is used to include a request time in the request frame, and is used to calculate a round-trip time. In an example, four bytes are allocated to the request time field 460B. The requested destination MAC address field 465B is used to carry the destination MAC address in the request frame. In an example, six bytes are allocated to the requested MAC address field 465B. The replier type field 480B is used to indicate whether the reply frame is from the requested destination device or a proxy on behalf of the requested destination device.

Figure 4C:
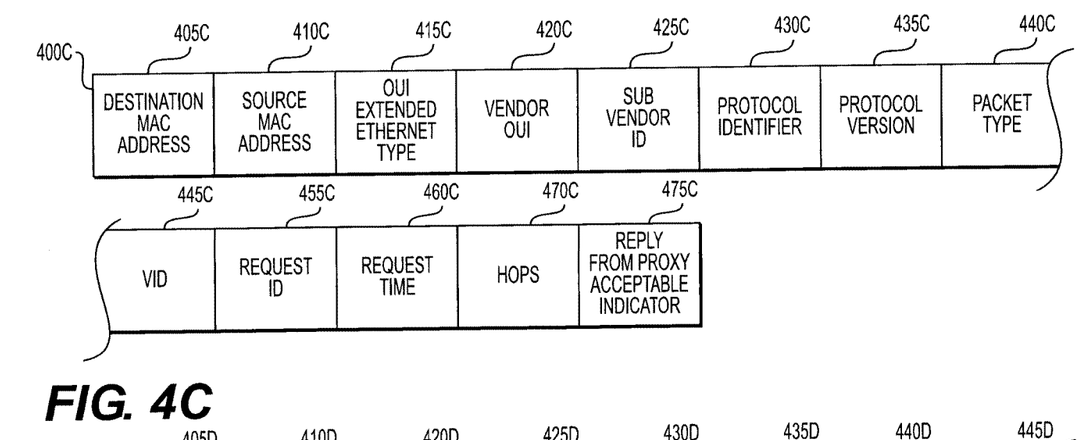

FIG. 4C shows a format example 400C of a request frame according to an embodiment of the disclosure. In an example, the test frame generator in the FIG. 1 example generates a request frame of the format 400C to trace a path from a source device to destination devices. The format 400C includes similar fields as the format 400A. In addition, the format 400C does not include the reply requirement indicator field, but includes a hops field 470C. The hops field 470C is used to carry the number of hops passed by the request frame.

Figure 4D:
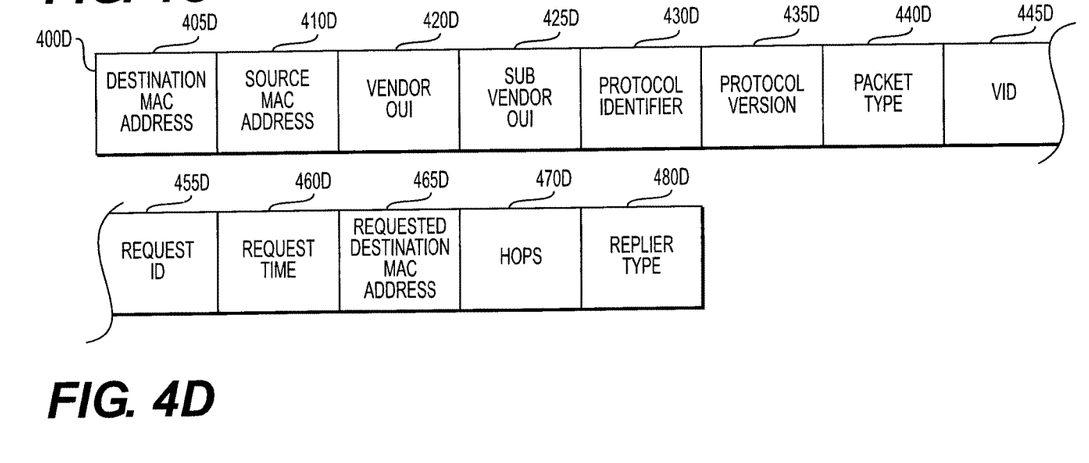

FIG. 4D shows a format example 400D of a reply frame according to an embodiment of the disclosure. In an example, each switch device passed by the request frame generates a reply frame of the format 400D. The format 400D includes similar fields as the format 400B. In addition, the format 400C includes a hops field 470D. The hops field 470D is used to carry the number of hops from intermediate device on the path that generates the reply frame.

Figure 5:
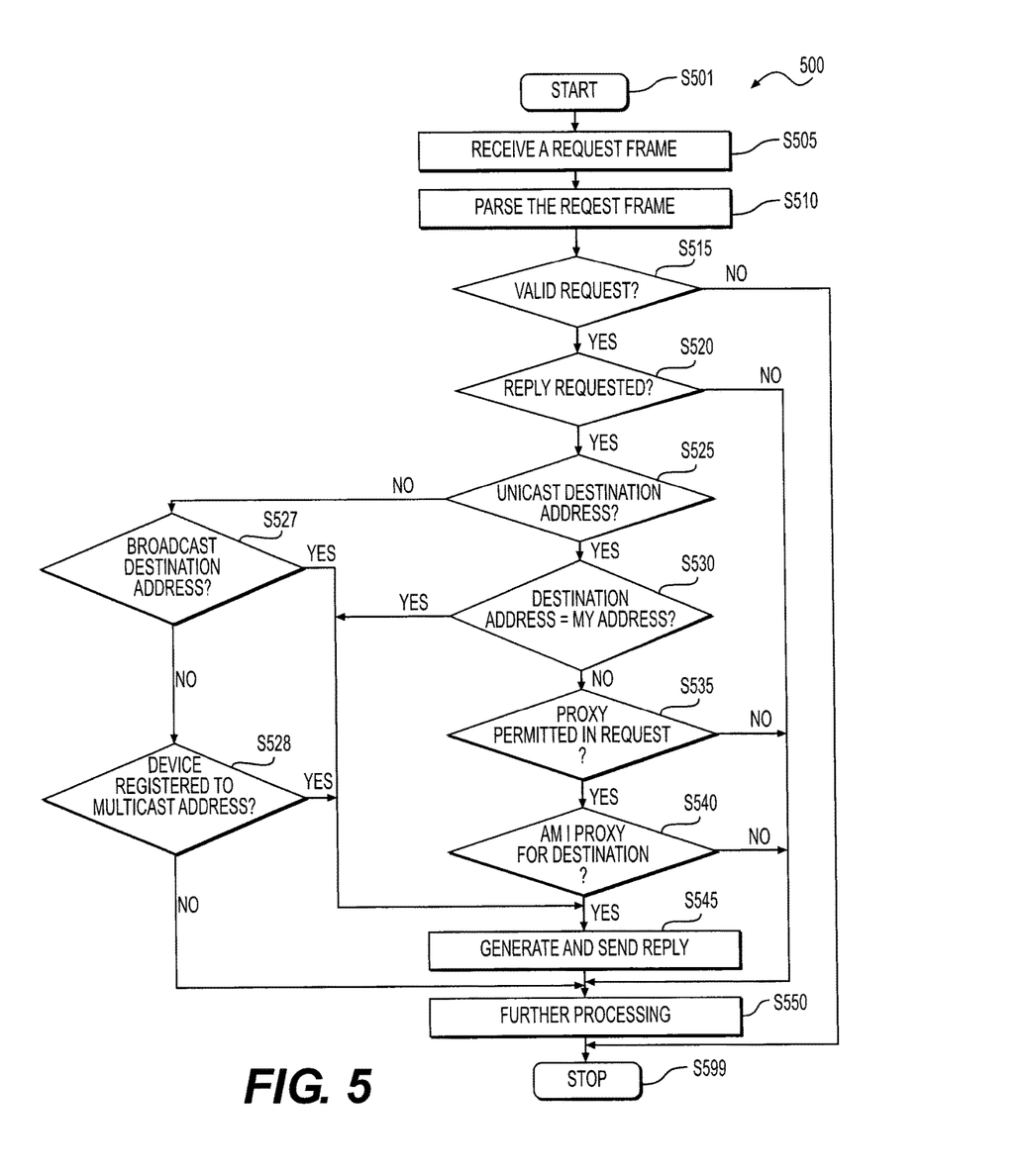
FIG. 5 shows a flow chart outlining a process example 500 for processing a request frame according to an embodiment of the disclosure.

FIG. 5 shows a flow chart outlining a process example 500 for handling a request frame according to an embodiment of the disclosure. In an example, the process is executed by a device, such as a switch device, a host device, and the like in the network 100. The process starts at S501 and proceeds to S505.

At S505, the device receives a request frame, such as a request frame of format 400A.

At S510, the device parses the request frame. For example, the device extracts values in each of the fields in the request frame.

At S515, the device determines whether the request frame is a valid request frame. In an example, the device determines whether the request frame has the format 400A and has meaningful values in the fields. When the request frame is a valid request frame, the process proceeds to S510; otherwise, the process proceeds to S599 and terminates.

At S520, the device determines whether a reply is required based on a field of the request frame. In an example, the device obtains a value in the request requirement indicator field 450A, and when the value is "1", the reply is required, and the process proceeds to S525, otherwise the process proceeds to S550.

At S525, the device determines whether an MAC address in the destination MAC address field is a unicast address. When the MAC address in the destination MAC field is a unicast address, the process proceeds to S530; otherwise, the process proceeds to S527.

At S527, the device determines whether the MAC address in the destination MAC address field is a broadcast address. When the MAC address in the destination MAC address field is a broadcast address, the process proceeds to S545; otherwise, the process proceeds to S528.

At S528, the MAC address in the destination MAC address field is a multicast address, and the device determines whether the device is registered to the multicast address. When the device is registered to the multicast address, the process proceeds to S545; otherwise, the process proceeds to S550.

At S530, the device determines whether the MAC address in the destination MAC address field of the request frame is the same as the MAC address of the device. When the MAC address in the destination MAC address field is the same as the MAC address of the device, the process proceeds to S545; otherwise, the process proceeds to S535.

At S535, the device determines whether proxy is permitted by the request frame. For example, the device obtains a value in the reply from proxy acceptable indicator field 475A, and when the value is "1", proxy is acceptable, the process proceeds to S540; and when the value is "0", proxy is not acceptable, the process proceeds to S550.

At S540, the device determines whether the device itself is the proxy for the destination device of the request frame. In an example, the device checks its configuration to determine whether the destination device is directly connected with the device. When the device is the proxy for the destination device, the process proceeds to S545; otherwise the process proceeds to S550.

At S545, the device generates a reply frame and sends the reply frame. In an example, the device generates a reply frame of the format 400B. The operations for generating the reply frame are explained in detail with regard to FIG. 6. Then the reply frame is sent back to the original device that generates the request frame, such as the host device H5 in the FIG. 1 example, by the network 100.

At S550, the device performs further processing based on the request frame. In an example, when the device is a switch device, the switch device updates its forwarding database based on the request frame. In another example, when the device is not the destination for the request frame, the device forwards the request frame based on network configurations, such as forwarding database, VLAN configuration and the like. Then the process proceeds to S599 and terminates.

It is noted that the process 500 can be suitably modified. For example, the operation of forwarding database update in S550 can be performed earlier, such as after S510. In another example, the sequence of S527 and S528 can be suitably changed.

Figure 6:
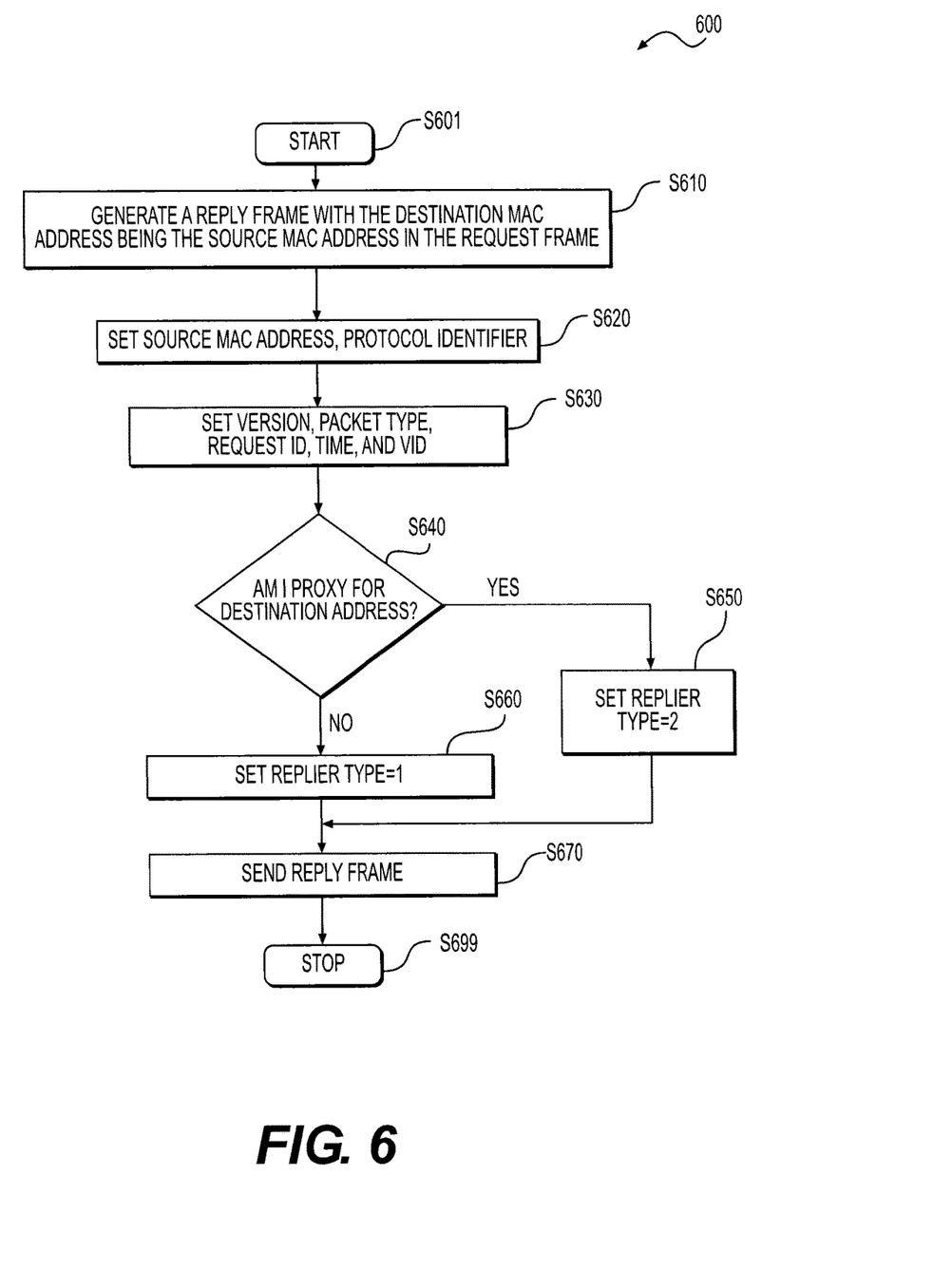
FIG. 6 shows a flow chart outlining a process example 600 for generating a reply frame according to an embodiment of the disclosure.

FIG. 6 shows a flow chart outlining a process example 600 for generating a reply frame according to an embodiment of the disclosure. In an example, the process 600 is executed by a device who is the destination device for the request frame or who is the proxy of the destination device for the request frame. The process starts at S601 and proceeds to S610.

At S610, the device generates reply frame with the destination MAC address being the source MAC address in the request frame. For example, the MAC address in the source MAC address field of the request frame is copied into the destination MAC address field of the reply frame.

At S620, the device sets the source MAC address in the reply frame. For example, the MAC address of the device is copied into the source MAC address field of the reply frame. The device also copies the protocol identifier from the request frame to the reply frame in an example.

At S630, the device sets the protocol version, the packet type, request ID, request time, and VID in the reply frame. For example, the request ID field, the request time field and the VID field of the request frame are copied into the corresponding fields in the reply frame. In an example, the protocol version field is set to "1"; the packet type field is set to "2" to indicate that this frame is a reply frame for example.

At S640, the device determines whether the device is the proxy for the destination device of the request frame. When the device is the proxy for the destination device of the request frame, the process proceeds to S650; otherwise, the device is the destination device of the request frame, and the process proceeds to S660.

At S650, the device sets the replier type field in the reply frame, for example to "2".

At S660, the device sets the replier type field in the reply frame, for example to "1".

At S670, the device sends out the reply frame. Then the process proceeds to S699 and terminates.

Figure 7:
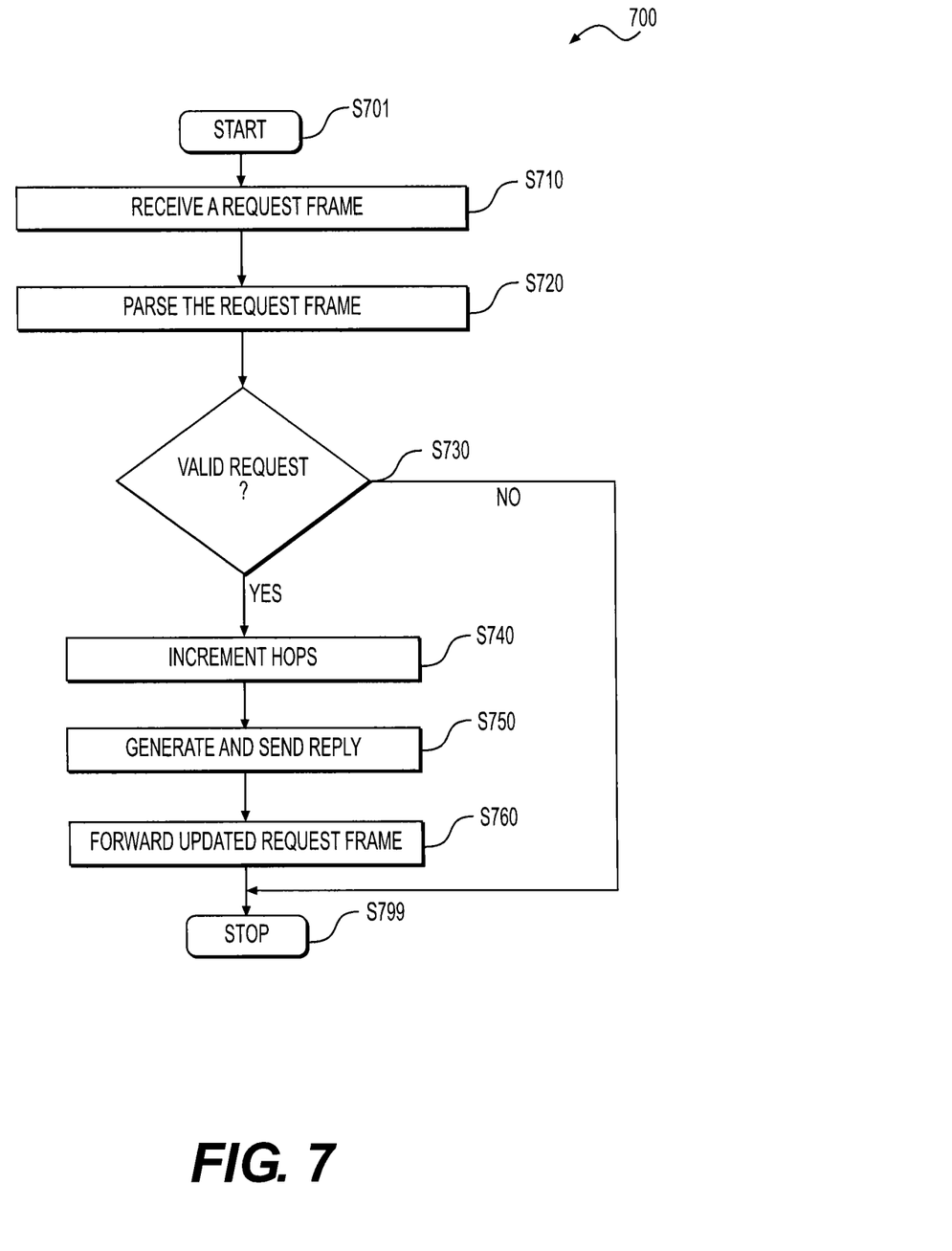
FIG. 7 shows a flow chart outlining a process example 700 for processing a request frame according to an embodiment of the disclosure.

FIG. 7 shows a flow chart outlining a process example 700 for handling a request frame according to an embodiment of the disclosure. In an example, the process is executed by a device, such as a switch device, a host device, and the like in the networks 100, 200 and 300. The process starts at S701 and proceeds to S799.

At S710, the device receives a request frame, such as a request frame of format 400C.

At S720, the device parses the request frame. For example, the device extracts values in each of the fields in the request frame.

At S730, the device determines whether the request frame is a valid request frame. In an example, the device determines whether the request frame has the format 400C, and has meaningful values in the fields. When the request frame is a valid request frame, the process proceeds to S740; otherwise, the process proceeds to S799 and terminates.

At S740, the device updates the number of hops. For example, the device increases the number of hops by one, and updates the number of hops in the hops field of the request frame accordingly.

At S750, the device generates a reply frame and sends the reply frame. In an example, the device generates a reply frame of the format 400D. The operations for generating the reply frame are similar to the operations described with regard to FIG. 6. In addition, the device sets the hops field of the reply frame to be the updated number of hops. Then the reply frame is sent back to the original device that generates the request frame, such as the host device H5 in the FIG. 1 example, by the network 100.

At S760, the device performs further processing based on the request frame. In an example, when the device is a switch device, the switch device updates its forwarding database based on the request frame. Further, in an example, the device forwards the request frame based on network configurations, such as forwarding database, VLAN configuration and the like. Then the process proceeds to S799 and terminates.

When implemented in hardware, the hardware may comprise one or more of discrete components, an integrated circuit, an application-specific integrated circuit (ASIC), etc.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A network device, comprising:
a test frame generator configured to generate a request frame and to transmit the request frame to a target network device that is a member of a virtual local area network (VLAN); and
an analyzer configured to transmit a query to the target network device to:
detect whether a forwarding database in the target network device includes an address of the network device,
determine whether the target network device is connected to the network device based on the detection,
receive another request frame from another device,
determine whether (i) a destination address of the received request frame is a unicast address and same as the address of the network device and (ii) the network device is directly connected to a destination device of the received request frame when a proxy is permitted, and
send a relay frame to the other device based on the determination.

2. The network device of claim 1, wherein the address of the network device is a media access control (MAC) address, the test frame generator is configured to generate the request frame that is compliant with a Layer 2 protocol to include the MAC address of the network device which is a first MAC address, a second MAC address associated with the target network device, and a number to identify the VLAN of which the network device is also a member.

3. The network device of claim 2, wherein the second MAC address is at least one of a unicast MAC address, a multicast MAC address and a broadcast MAC address.

4. The network device of claim 1, wherein the test frame generator is configured to generate the request frame that includes a reply field indicative of whether a reply is required.

5. The network device of claim 4, wherein
the test frame generator is configured to generate the request frame that includes a request time field to carry a request time when the request frame is sent out of the network device; and the analyzer is configured to calculate a round-trip time based on a time when a reply frame is received and the request time, the reply frame being generated in response to the request frame, and the reply frame carrying the request time.

6. The network device of claim 1, wherein
the test frame generator is configured to generate the request frame that includes a hops field to carry a number of hops; and
the analyzer is configured to construct a path from the network device to the target network device based on hop numbers carried by reply frames that are generated and sent by devices on the path in response to the request frame.

7. The network device of claim 1, wherein the analyzer is configured to transmit the query that is compliant with a Layer 3 network protocol.

8. A method for testing a network, comprising:
generating, by a network device, a request frame;
transmitting the request frame from the network device to a target network device that is a member of a virtual local area network (VLAN);
transmitting, a query to the target network device to detect whether a forwarding database in the target network device includes an address of the network device;
determining whether the target network device is connected to the network device based on the detection;
receiving another request frame from another device;
determining whether (i) a destination address of the received request frame is a unicast address and same as the address of the network device and (ii) the network device is directly connected to a destination device of the received request frame when a proxy is permitted; and
sending a relay frame to the other device based on the determination.

9. The method of claim 8, wherein the address of the network device is a media access control (MAC) address, generating, by the network device, the request frame comprises:
generating the request frame that is compliant with a Layer 2 protocol to include the MAC address of the network device which is a first MAC address, a second MAC address associated with the target network device, and a number to identify the VLAN of which the network device is also a member.

10. The method of claim 9, wherein generating the request frame that is compliant with the Layer 2 protocol to include the MAC address of the network device which is the first MAC address, the second MAC address associated with the target network device, and the number to identify the VLAN of which the network device is also a member further comprises:
generating the request frame that includes the second MAC address that is at least one of a unicast MAC address, a multicast MAC address and a broadcast MAC address.

11. The method of claim 8, wherein generating, by the network device, the request frame comprises:
generating the request frame that includes a reply field indicative of whether a reply is required.

12. The method of claim 11, wherein:
generating the request frame that includes a request time field to carry a request time when the request frame is sent out of the network device;
receiving a reply frame generated in response to the request frame, the reply frame carrying the request time; and
calculating a round-trip time based on a time when the reply frame is received and the request time.

13. The method of claim 8, wherein
generating the request frame that includes a hops field to carry a number of hops;
receiving reply frames that are generated and sent by devices on a path from the network device to the target network device, the reply frames carrying hop numbers from the devices to the network device; and
constructing the path from the network device to the target network device based on the reply frames.

14. The method of claim 8, wherein the address of the network device is a media access control (MAC) address, transmitting, the query to the target network device to detect whether the forwarding database in the target network device includes the MAC address of the network device further comprises:
transmitting the query that is compliant with a Layer 3 network protocol.

* * * * *